July 24, 1962
T. R. NICOLAI
3,045,772
DRIVE FOR MOTOR BIKES
Filed Feb. 17, 1959
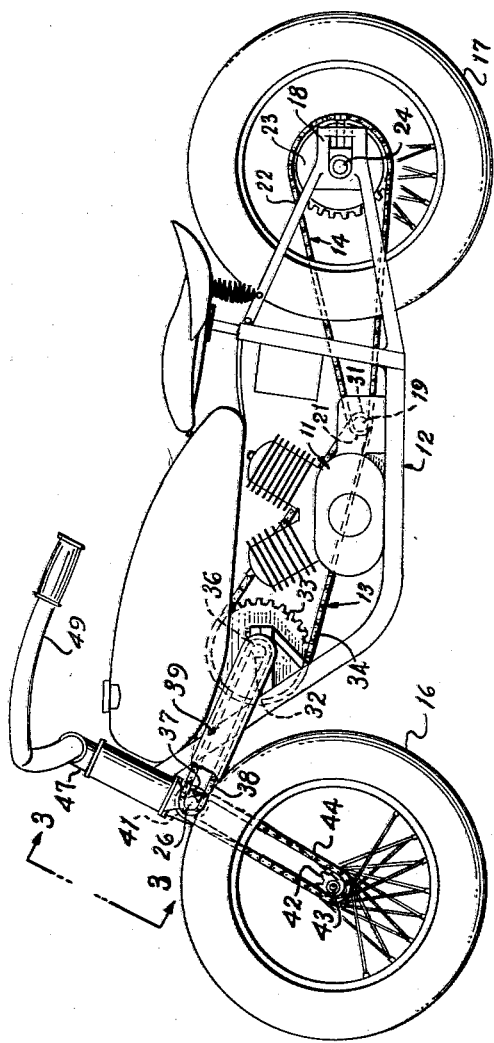
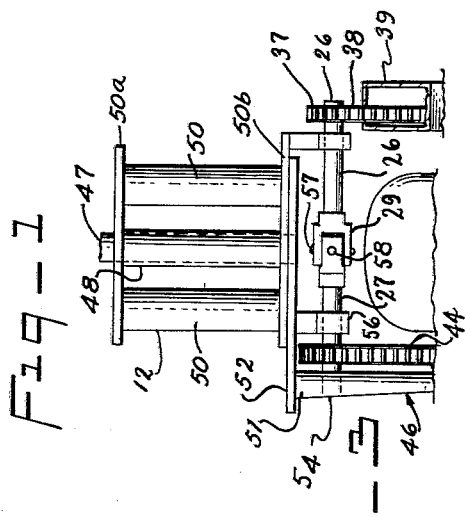
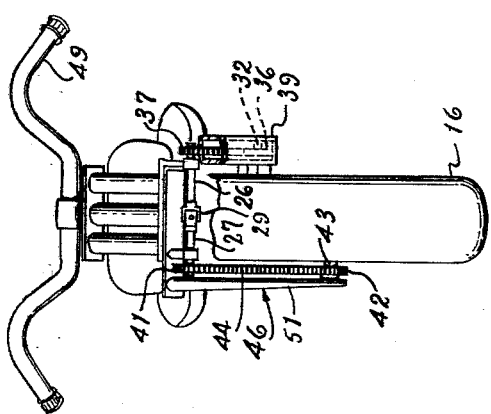
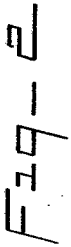
INVENTOR.
THEODORE R. NICOLAI
BY *A. Schapp*
ATTORNEY ём
United States Patent Office 3,045,772
Patented July 24, 1962

---

3,045,772
DRIVE FOR MOTOR BIKES
Theodore R. Nicolai, 26958 Baseline, Highland, Calif.
Filed Feb. 17, 1959, Ser. No. 793,924
2 Claims. (Cl. 180—31)

This invention relates to powered, tandem wheel vehicles, commonly known as motor bikes, and more particularly to improvements in drive conenctions to the front wheel thereof.

Engine driven bicycles, more usually known as motorcycles or motor bikes, are usually driven by applying the rotative force of the engine to the rear wheel through a chain and sprocket assembly.

Application of the motive power to both of the wheels would, of course, double the traction and give the motor bike much better accelerating and hill-climbing ability.

To obtain an effective dual-wheel drive of this nature presents certain obstacles due to the nature of the motor bike construction. These bikes consist basically of a rear wheel journaled directly on the vehicle frame which also supports the motive power, usually a gasoline engine.

For purposes of steering, the front wheel is journaled in a fork having an erect stem mounted in a bearing at the front end of the frame. A handlebar is connected to the stem and serves to pivot the fork from side to side so as to swing the front wheel and steer the vehicle.

This necessary swinging movement of the front wheel makes it impossible to transmit power from the motor through the pair of sprockets and entrained chain used at the rear.

Certain attempts have been made to transmit the motive power through flexible cables, but these have been too costly and prone to excessive wear as well as being limited in the amount of torsion which they can handle.

The present invention contemplates a motor bike having a drive chain passing through the axis about which the fork rotates, and the interposition of a flexible connection at the intersection. This permits full power to be applied to the front wheel as it swings from side to side as well as when it is pointing straight ahead.

It is therefore a principal object of the present invention to provide a motor bike having a drive train which will transmit equal motive power to both the rear and front wheels under all conditions and at all positions of the latter.

Another object of the invention is the provision of a drive train for motor bikes which will transmit the full rotative force of the motive means to the front wheel at any position during steering of the bike.

A further object of the invention is to provide a front wheel drive for motor bikes consisting of firmly mounted elements over its greater portion and having a single flexible connection located to transmit power to the front wheel while permitting swinging movement of the wheel from side to side.

A still further object of the invention is the provision, in a motor bike of the character described, of a fork construction accommodating swinging of the front wheel through the full range of movement provided for by the flexible connection.

And finally, it is proposed to provide a front wheel drive of the nature set forth which may be attached to existing types of motor bikes with little or no modification of the frame or other structure, the drive train including a novel fork used to replace the conventional front wheel fork.

Further objects and advantages of my invention will appear as the specification proceeds, and the new and useful features of the frive for motor bikes disclosed herein will be fully defined in the claims attached hereto.

In the drawings:

FIGURE 1 is a side elevational view of a motor bike equipped with a drive system constructed in accordance with the present invention;

FIGURE 2 is a front elevational view of the motor bike of FIGURE 1; and

FIGURE 3 is an enlarged fragmentary detail view taken from the front of the motor bike and showing a flexible connection forming part of the drive train of the present invention.

While I have shown only the preferred form of my invention, I wish to have it understood that various changes or modifications may be made within the scope of the claims hereto atached, without departing from the spirit of the invention.

Referring to the drawing in detail, my drive for motor bikes includes a motive means such as a gasoline engine 11 mounted on the frame 12 of the motor bike, and drive trains 13 and 14 operatively connecting the engine to the front and rear wheels 16 and 17, respectively.

The construction of the rear end of the bike, and of the drive train 14 is here of a conventional type. The rear wheel 17 is journaled in a rear fork 18 forming a part of the frame 12. Mounted on the drive shaft 19 of the engine 11 is a sprocket 21 which engages a chain 22 entrained around a sprocket 23 affixed to the axle 24 of the rear wheel 17.

As an important feature of the present invention, the front wheel drive train 13 is operative in all positions of the front wheel 16. This is accomplished by providing a flexible, swivel connection in the drive train 13 at a position which allows steering of the bike without interference with the driving force transmitted, and without restricting the steering action.

Conventionally, motor bikes are steered by swinging the front wheel from side to side about an upright axis. This is usually accomplished by mounting the front wheel in a fork which is journaled to the frame to rotate about an axis inclined somewhat to the rear to give a castering action.

The drive train 13, of the present invention, includes an input shaft 26 operatively connected by the drive means 13 to the engine 11, and an output shaft 27 operatively connected to the front wheel. A flexible connection 29 transmits rotation from the input shaft 26 to the output shaft 27.

Operative connection of the input shaft 26 to the engine 11 is effected by the drive means 13, which here includes a sprocket 31 mounted on the engine shaft 19. A countershaft 32 is journaled on the bike frame 12 and carries a sprocket 33 which is driven by a chain 34 entrained around the sprockets 31 and 33.

On the other end of the countershaft 32 is a sprocket 36 which drives a sprocket 37 on the input shaft 26 through a chain 38. Preferably, in order to protect the parts and the rider, sprockets 36 and 37 and chain 38 are enclosed in a housing 39 which may constitute a section of tubing closed off at both ends and attached to the bike frame.

The operative connection between the output shaft 27 and the front wheel 16 is here provided by sprockets 41 and 42 on the output shaft and the front wheel axle 43, respectively, and by a chain 44 entrained around the sprockets.

In accordance with the present invention, the output shaft 27 the front wheel 16, and the associated operative connection are carried upon a special split fork 46, which replaces the conventional bifurcated fork. This fork has a conventional fork stem 47, journaled in a tubular bearing sleeve 48 fixedly carried at the front end of the frame 12, the stem 47 being attached at its upper end to the usual handlebars 49. Great rigidity and strength is provided by a pair of posts 50 mounted on opposite sides of sleeve 48 and secured thereto by upper and lower cross-members 50a and 50b.

Secured to the lower end of the stem 47 for rotation therewith is a single fork leg consisting of horizontal and depending portions 52 and 51. The front wheel is journaled in any suitable manner on its axle 43 at the lower end of the portion 51, and the output shaft 27 is journaled in suitable bearings 54 and 56 near the upper end of the fork leg, the input shaft 26 being journaled in a bearing member suspended from the end of the lower cross member 50b.

The flexible connection 29, between the input and output shafts, is here shown as constituting a conventional universal joint. It will be understood that other flexible connections may be used between the input and output shafts, but in order to provide full torsion transmitting ability, and to prevent whipping and wear, it is preferred that the connection be as close-coupled as possible.

The universal joint shown fulfills these conditions while permitting adequate swinging movement of the fork for steering.

Other suitable flexible connections are envisioned, among them being a pair of bevel gears mounted on the input and output shafts and transmitting rotary motion therebetween through a third bevel gear journaled on the fork to rotate around the axis of the stem 47.

With reference to the location of the flexible connection 29, it should be noted that the input and output shafts 26 and 27 are supported, on the frame 11 and fork 46, with their respective axes intersecting the axis of the fork stem 47 at the same point.

The flexible connection 29 is located with its center on the same point, that is, with the axes 57 and 58 of the universal pivots passing through the intersection of the axes of the shafts 26, 27 and stem 47. This permits completely free rotation of the fork stem without interference with the drive connection.

As here shown, the input and output shafts 26 and 27 are in coaxial relation when the front wheel is pointing straight ahead. This is primarily because it is necessary, with chain and sprocket drives, to have the axis of the driven shaft parallel to the axis of the drive shaft.

Should other drive means be employed between the engine shaft 19 and the input shaft 26, the latter may be at any convenient angle to the output shaft within the limitations of the particular connection chosen. For example, if the above-mentioned bevel gear arrangement were used, the output and input shafts could be at any possible angle to each other, subject to the limitation that their axes must each be perpendicular to the axis of the stem 47, if 45° bevel gears are to be used.

It should further be noticed that the drive of the present invention may be used in connection with a rear wheel drive, in which case the ratios should be chosen so that the peripheral speed of the front and rear wheels are identical, or the front wheel drive may be used alone.

Moreover, the drive of the present invention is readily adaptable for production as an attachment for existing motor bikes to convert them to front wheel or dual wheel drive.

I claim:

1. A front wheel drive for a motor bike having a front wheel, a rear wheel, a frame supported by the wheels, a power plant supported by the frame and a fork stem bearing sleeve rising from the frame in rearwardly inclined relation with respect to the axis of the front wheel and in the plane thereof, the drive comprising a pair of posts mounted on the frame on opposite sides of the fork stem bearing sleeve, a cross-member connecting the upper ends of the posts to the upper end of the bearing sleeve, a second cross-member connecting the lower ends of the posts to the lower end of the bearing sleeve and having a bearing member suspended from one end thereof, a steering stem revolvable in the bearing sleeve and having a third cross-member fixed thereon below and adjacent to the second cross-member, a second bearing member suspended from the third cross-member and adapted for lining up with the first bearing member, a fork leg projecting downwardly from the third cross-member outwardly of and spaced from the second bearing member and having a front wheel bearing mounted upon the lower end thereof, an input shaft revolvable in the first bearing member and having means connected to the power plant for rotating the same, an output shaft revolvable in the second bearing member and in the said leg, a driving connection between the output shaft and the front wheel, and a universal connection between the two shafts made to allow the output shaft to turn about the axis of the steering stem as the latter is turned in steering operations.

2. A front wheel drive as defined in claim 1 in which the driving connection between the output shaft and the front wheel comprises a chain drive mounted between the said leg and the second bearing member.

References Cited in the file of this patent

UNITED STATES PATENTS

| | | |
|---|---|---|
| 1,139,622 | Yordi | May 18, 1915 |
| 1,142,066 | Sutherland | June 8, 1915 |
| 1,153,800 | Larkins et al. | Sept. 14, 1915 |
| 1,242,500 | Wilcox | Oct. 9, 1917 |
| 2,511,320 | Benson | June 13, 1950 |
| 2,928,487 | Bobard | Mar. 15, 1960 |

FOREIGN PATENTS

| | | |
|---|---|---|
| 1,023,739 | France | Dec. 30, 1952 |
| 1,084,294 | France | July 7, 1954 |